United States Patent [19]

Moore, III et al.

[11] Patent Number: 5,555,584
[45] Date of Patent: * Sep. 17, 1996

[54] METHOD OF PRODUCING CUSTOM-FITTING ARTICLES AND COMPOSITION FOR THE USE THEREWITH

[75] Inventors: Dan T. Moore, III, Cleveland Heights; Deborah L. James, Cleveland; Maurice E. Wheeler, Ashtabula; William H. Weber, Novelty; James W. Hoover, Akron, all of Ohio

[73] Assignee: Polymer Innovations, Inc., Cleveland, Ohio

[ * ] Notice: The portion of the term of this patent subsequent to Jan. 8, 2013, has been disclaimed.

[21] Appl. No.: 93,282

[22] Filed: Jul. 16, 1993

Related U.S. Application Data

[63] Continuation-in-part of Ser. No. 2,281, Jan. 8, 1993, abandoned, which is a continuation-in-part of Ser. No. 972,237, Nov. 5, 1992, abandoned.

[51] Int. Cl.$^6$ .............................. A43D 9/00; A61F 5/14; A43B 7/14; C08L 83/00
[52] U.S. Cl. .................. 12/142 N; 12/146 M; 36/88; 36/93; 36/43; 36/71; 36/154; 524/506; 525/100
[58] Field of Search ................................. 36/88, 93, 8.4, 36/43, 44, 71, 154; 12/142 N, 146 B, 146 M; 99/342; 374/161, 162; 524/506, 314; 525/100; 523/167

[56] References Cited

U.S. PATENT DOCUMENTS

| | | |
|---|---|---|
| 2,838,776 | 12/1954 | Tax . |
| 3,257,742 | 2/1963 | Feinberg . |
| 3,575,780 | 4/1971 | Trieschmann et al. ............ 273/DIG. 4 |
| 3,593,435 | 7/1971 | Lange ......................................... 36/71 |
| 3,641,688 | 2/1972 | von den Benken . |
| 3,692,023 | 9/1972 | Phillips et al. . |

(List continued on next page.)

FOREIGN PATENT DOCUMENTS

| | | |
|---|---|---|
| 3437786 | 4/1986 | Germany . |
| WO85/03624 | 8/1985 | WIPO . |

OTHER PUBLICATIONS

"Poly(Vinyl Chloride)", *Kirk–Othmer Concise Encyclopedia of Chemical Technology*, (John Wiley & Sons, Inc., 1985), pp. 1230–1233, particularly Table 1.

DuPont Elvaloy 741 742, technical data brochure, 7 pages (The DuPont Company, approx. 1983).

Dow Corning STI Technical Information, Silastic Q4–4758 & Q4–4768 Silicone Rubber, 4 pages (Dow Corning STI, 1991).

Dow Corning STI Technical Information, STI (Type) T Catalyst, 4 pages (Dow Corning STI, 1991).

*Primary Examiner*—Paul T. Sewell
*Assistant Examiner*—Marie Denise Patterson
*Attorney, Agent, or Firm*—Pearne, Gordon, McCoy & Granger

[57] ABSTRACT

A method of producing a custom-fitting article such as a custom-fitting footbed (for example, a removable insole), a custom-fitting hand grip, a custom-fitting body pad, and a custom-fitting orthopedic cast. A member for producing same and a composition for use in connection therewith are also provided. A member, such as a gel pad or gel-filled envelope, is provided which comprises a body of formable material having a minimum setting temperature greater than 130° F. and being setable by heating for a period not exceeding 30 minutes and subsequent cooling. The member is conformed by biasing it against a body part of a person or mammal with sufficient pressure to conform the member to the shape of the body part. The member is then heated for a period not exceeding 30 minutes and thereafter cooled so that the formable material is set and the member remains flexible while resiliently retaining an impression of the body part. The composition preferably comprises uncured silicone rubber, an effect amount of crosslinking agent, and effective amounts of a) fine powder ethylene copolymer or terpolymer or a mixture thereof and b) liquid plasticizer.

27 Claims, 5 Drawing Sheets

U.S. PATENT DOCUMENTS

| | | |
|---|---|---|
| 3,730,169 | 5/1973 | Fiber . |
| 3,782,390 | 1/1974 | Johnson . |
| 3,895,405 | 7/1975 | Edwards . |
| 3,905,376 | 9/1975 | Johnson et al. . |
| 3,968,577 | 7/1976 | Jackson . |
| 3,977,033 | 8/1976 | Tabroff ................................. 12/54.3 |
| 3,981,037 | 9/1976 | McCroskey, Sr. . |
| 4,006,542 | 2/1977 | Larson . |
| 4,105,025 | 8/1978 | Wang et al. . |
| 4,108,928 | 8/1978 | Swan, Jr. . |
| 4,120,064 | 10/1978 | Salomon . |
| 4,128,951 | 12/1978 | Tansill . |
| 4,229,546 | 10/1980 | Swan, Jr. . |
| 4,272,898 | 6/1981 | Tansill ................................. 36/44 |
| 4,275,181 | 6/1981 | Hoh ................................. 525/189 |
| 4,309,585 | 1/1982 | Doi et al. ................................. 99/342 |
| 4,413,429 | 11/1983 | Power . |
| 4,433,494 | 2/1984 | Courvoisier et al. . |
| 4,483,333 | 11/1984 | Wartman . |
| 4,503,576 | 3/1985 | Brown . |
| 4,520,581 | 6/1985 | Irwin et al. . |
| 4,617,921 | 10/1986 | Seeler . |
| 4,671,267 | 6/1987 | Stout . |
| 4,770,648 | 9/1988 | Gillis . |
| 4,821,708 | 4/1989 | Guignard et al. . |
| 4,888,225 | 12/1989 | Sandvig et al. . |
| 4,901,390 | 2/1990 | Daley . |
| 4,933,525 | 6/1990 | St. Phillips ................................. 374/161 |
| 5,003,708 | 4/1991 | Daley . |
| 5,015,427 | 5/1991 | Sosnow ................................. 36/71 |
| 5,027,801 | 7/1991 | Grim . |
| 5,051,463 | 9/1991 | Yukimoto et al. ................................. 524/506 |
| 5,067,257 | 11/1991 | Coomer . |
| 5,101,580 | 4/1992 | Lyden ................................. 36/93 |
| 5,138,774 | 8/1992 | Sarkozi ................................. 36/164 |
| 5,150,490 | 9/1992 | Busch et al. . |
| 5,258,212 | 11/1993 | Tomaru et al. ................................. 206/524 |

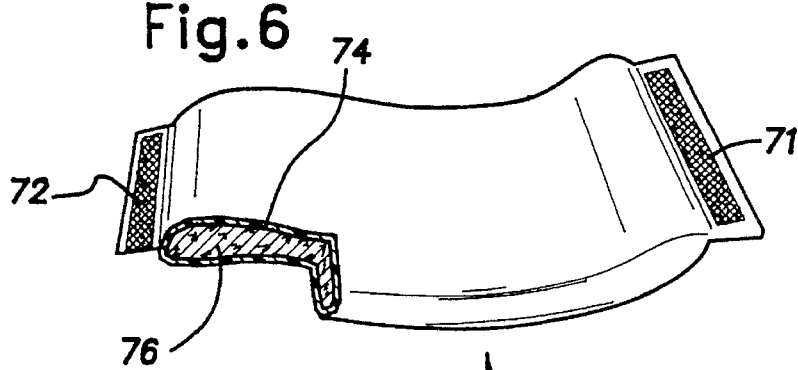
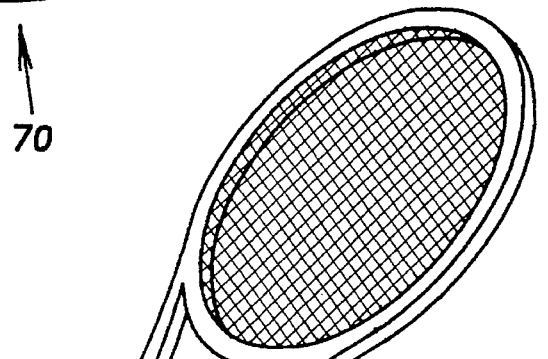
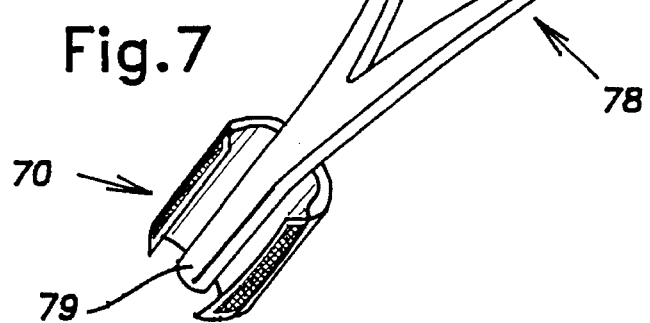
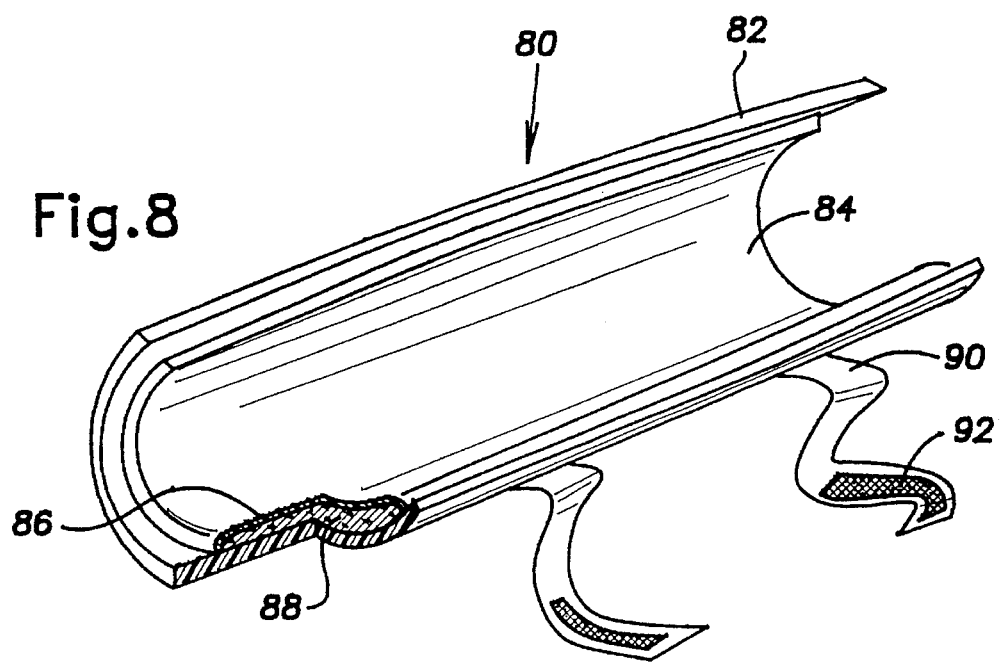

METHOD OF PRODUCING CUSTOM-FITTING ARTICLES AND COMPOSITION FOR THE USE THEREWITH

This application is a continuation-in-part of application Ser. No. 08/002,281, filed Jan. 8, 1993, now abandoned which is a continuation-in-part of application Ser. No. 07/972,237, filed Nov. 5, 1992, now abandoned.

BACKGROUND OF THE INVENTION

This invention relates in general to custom-fitting articles and compositions useful in making same and in particular to custom-fitting articles which conform to the shape of a body part of a mammal, particularly a person.

DESCRIPTION OF RELATED ART

Many articles which are intended to conform to the shape of a body part of a mammal, such as a person, for example, certain footbeds for footwear, hand grips, protective pads and padding, and medical and veterinary appliances, are not custom-fitted. It has long been recognized that it is advantageous to custom fit articles of these types to the particular conformation and shape of the body so that the article is more comfortable to wear and the weight and pressure is distributed more evenly.

With regard to custom-fitting footwear, there have been a number of approaches. In one approach, a chemical reaction is initiated in a formable material in a footbed, the person then steps into the footwear or shoe and forms an impression and the material is allowed to cure before the footbed is used. See U.S. Pat. Nos. 4,520,581; 4,128,951; 2,838,776; and 4,888,225. U.S. Pat. No. 3,968,577 illustrates a system in which an impression of the foot is made, and the material is cured or set either pursuant to room temperature vulcanizing or by being heated in an oven for an unreasonably long period of time.

Other patents disclose a shoe or sandal having a bottom layer of a thermoplastic material. The thermoplastic material is heated, thus softening it. The person steps into the shoe and makes an impression. The material then cools, retaining the impression of the foot. See U.S. Pat. Nos. 3,641,688; 4,413,429; 4,433,494; 4,503,576; 3,895,405; and 4,901,390. All the foregoing patents are incorporated herein by reference.

These approaches suffer from a number of deficiencies. Once a catalyst is added, the activation may be irreversible and the impression may have to be made quickly. Some catalysts may require kneading, which is difficult with viscous material and time-consuming. Making an impression in hot thermoplastic material may be dangerous to the foot and it is not possible for the customer to feel how the shoe will fit prior to heating.

Most hand grips, such as for bicycles, sports rackets, ski poles, etc., are not custom-fitted; they are made so that one size fits all. Most body pads, such as knee pads, elbow pads, helmet pads, shin guards, etc. are also made so that one size fits all. Many prosthetic or orthopedic casts, splints, and braces do not have, biased against the body part, a custom-fitted flexible yet resilient member conforming to the body part to cushion and more evenly distribute the weight or pressure.

It is an object of this invention to provide a method of producing a custom-fitting article which overcomes these deficiencies, the method being quick and effective and which the customer can perform at home and producing a member which remains flexible while resiliently retaining the impression of the body part. It is also an object to provide a member or article which the purchaser or user can test for feel and fit before the impression is set.

SUMMARY OF THE INVENTION

A method of producing a custom-fitting article which conforms to the shape of a body part of a mammal is provided. The method includes providing a member comprised of a body of formable material, the body of formable material having a minimum setting temperature greater than 130° F. and being setable by heating for a period not exceeding 30 minutes and subsequent cooling. The member is conformed by biasing the member against the body part with sufficient pressure to conform the member to the shape of the body part. The member is then heated for a period not exceeding 30 minutes and thereafter cooled so that the formable material is set and the member remains flexible while resiliently retaining an impression of the body part. The member is utilizable by the mammal as part or all of the custom-fitting article. A member for use in connection with the method is also provided. A composition is also provided which comprises uncured silicone rubber, an effective amount of crosslinking agent, and effective amounts of a) fine powder ethylene copolymer or terpolymer or a mixture thereof and b) liquid plasticizer to form a gel effective to receive and retain an impression, the composition having a minimum setting temperature greater than 130° F. and being formable and setable to form a flexible and resilient body.

BRIEF DESCRIPTION OF THE DRAWINGS

FIG. 6 is a perspective view, with a portion cutaway in cross section, of a gel pad or member for forming a hand grip.

FIG. 7 is an exploded view of the hand grip gel pad of FIG. 6 on the handle portion of a tennis racket.

FIG. 8 is a perspective view, with a portion cutaway in cross section, of a shin guard according to the present invention.

DESCRIPTION OF PREFERRED EMBODIMENTS

A footbed supports the foot when footwear is worn and/or provides the bed upon which the underside of the foot rests when footwear is worn. As used herein the term "footbed" includes a removable insole or innerliner. Thus a footbed may be a separable or integral component of footwear. Footwear includes sandals, shoes, slippers, and boots. Footwear, which also includes socks for diving suits, swimming flippers, water and snow ski boots, and skates such as ice skates and inline skates, is worn on the foot.

Figure 1:
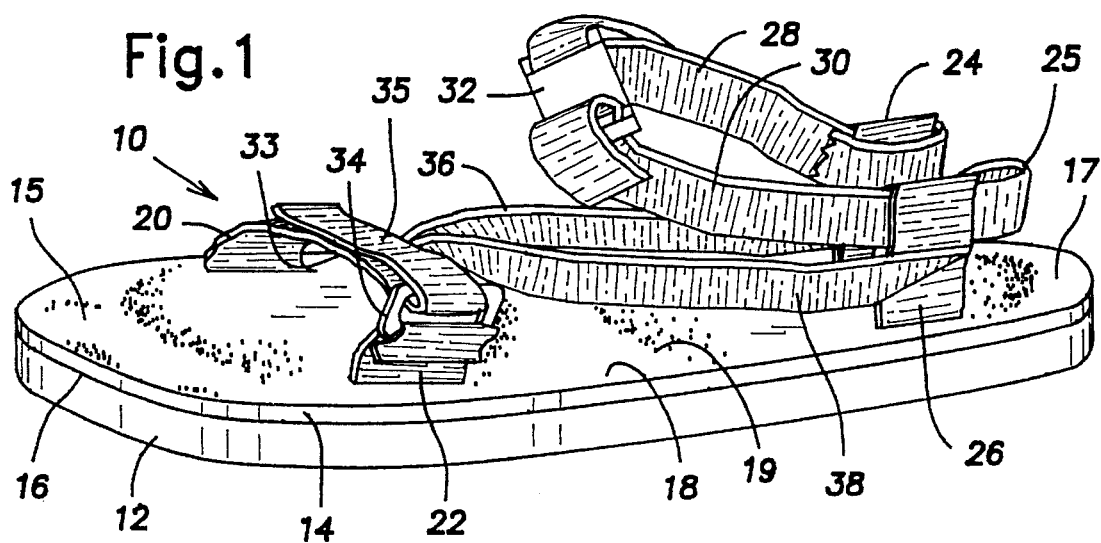
FIG. 1 is a perspective view of footwear, specifically a sandal, according to the present invention.

With reference to FIG. 1, there is shown footwear, specifically a sandal 10 for a person's left foot. The sandal has a toe end 15, a heel end 17, an outside 19, and an inside 13 (see FIG. 2). The sandal includes a top sole 18, a bottom sole 12, and a strapping mechanism or system, preferably made of ¾ inch tubular nylon webbing, to hold the foot. The top sole 18 has a side 14 which meets the bottom sole 12 at margin 16. The toe strap 20 has a lower lateral portion 33 which passes through D-ring 34 and continues as upper lateral portion 35, which is secured to lower lateral portion 33 by hook and loop fasteners, such as Velcro. Toe post 22 secures the D-ring to the sandal. Heel posts 24 and 26 secure the heel portion of the strapping mechanism to the sandal. The strap which forms heel post 26 continues as lateral strap 38 which is secured by stitching to lower lateral portion 33 and continues as lateral strap 36 through the loop formed by heel post 24, continuing on to form heel strap 25, continuing through the loop formed by heel post 26 to form instep strap 30 which can be cinched down through a cinching mechanism in quick release clasp 32. Once the instep strap 30 is properly cinched down, the wearer can take the sandal on and off using quick release clasp 32. Any quick release clasp as known in the art can be used. Heel strap 25 goes around the heel of the wearer. Instep strap 28 is secured at one end to heel post 24 and at the other end to the portion of the quick release clasp opposite the cinching mechanism. Other strapping mechanisms or systems as are known in the art can be utilized in connection with the present invention.

Figure 2:
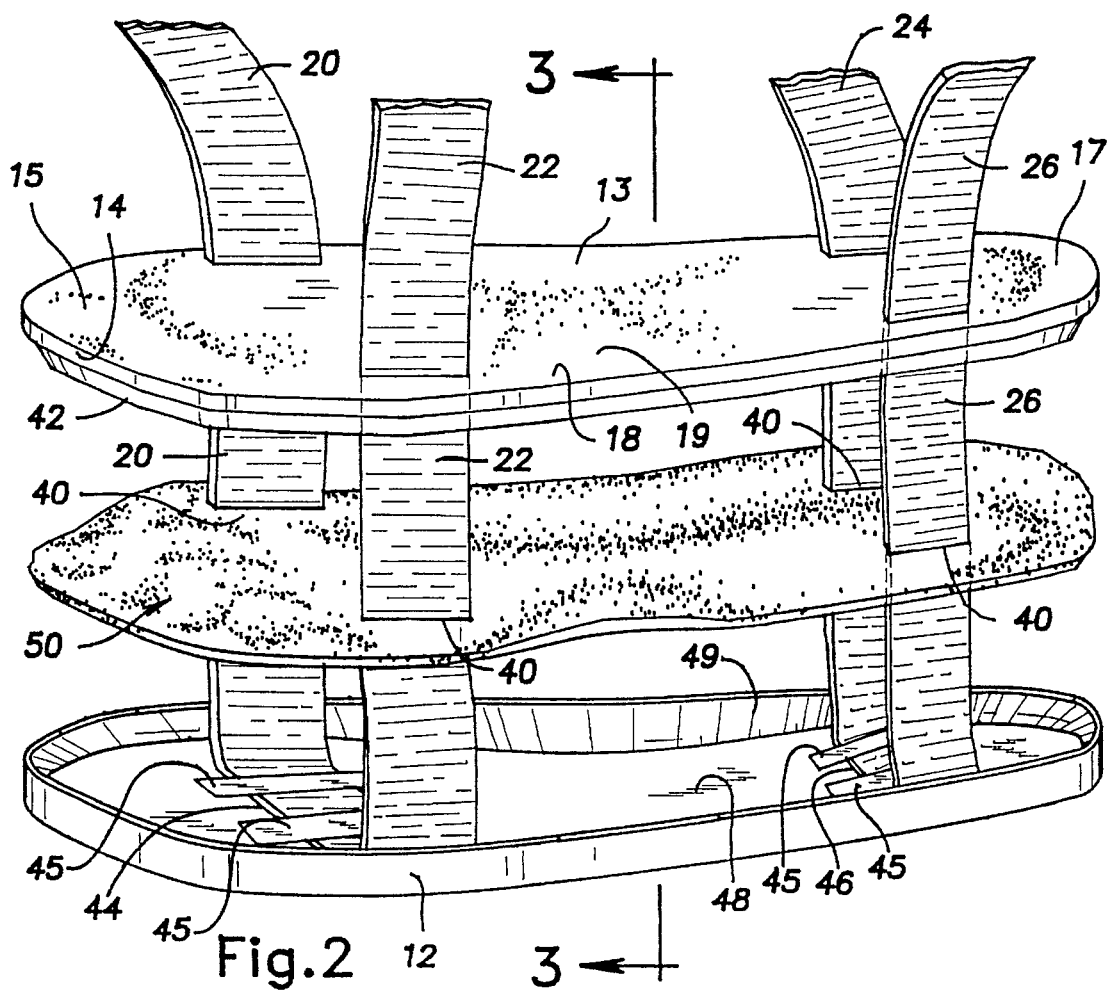
FIG. 2 is an exploded view of the sandal of FIG. 1.
Figure 3:
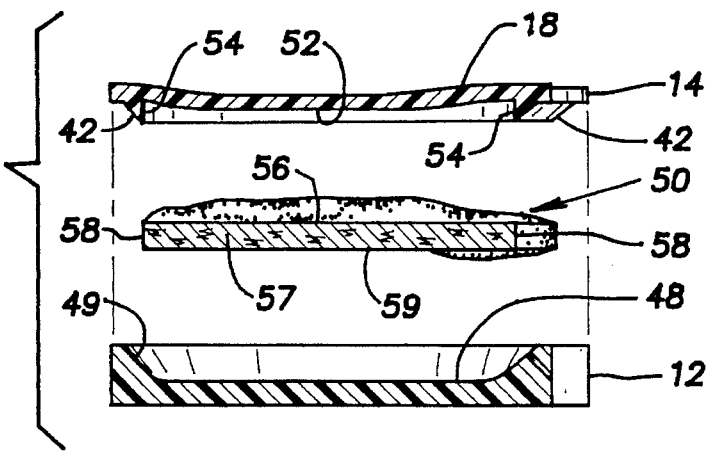
FIG. 3 is a sectional view taken along line 3—3 of FIG. 2.

With reference to FIGS. 2 and 3, there are shown three principal elements of the sandal, including the top sole 18, the bottom sole 12, and the gel layer 50 disposed therebetween. The top sole 18 and the gel layer 50 constitute the member which is used to produce a custom-fitting footbed. The top sole 18 and the gel layer 50 support the foot when the sandal is worn and provide a bed upon which the underside of the foot rests when the sandal is worn. The bottom portions 44 and 46 of the straps 20–22 and 24–26 respectively, are attached by gluing means or other methods known in the art, to the inside surface 48 of the bottom sole 12. The reinforcing strips 45 may be similarly attached to further secure bottom portions 44 and 46 to the bottom sole 12. The gel layer 50 preferably comprises a body of formable material, specifically gel material 57, encased in an envelope 59, preferably airtight, for ease of handling and to keep the gel and any fumes contained. Alternatively the gel material may be unencased. The gel layer and gel material are formable and conformable. Slits 40 are cut or otherwise provided through the gel layer 50 and top sole 18 to permit straps 20, 22, 24, and 26 to pass therethrough. The margins of the envelope 59 at slits 40 are preferably sealed to contain the gel material. The top sole 18 has on its underside a cavity defined by top surface 52 and sides 54. The gel layer 50 has a top 56 and sides 58. The upper portion of the gel layer nests in the cavity of the top sole 18. The bottom surface of the gel layer rests on the inside surface 48 of the bottom sole 12. The beveled surface 42 of the top sole engages the beveled surface 49 of the bottom sole when the sandal is assembled. Lateral flow of the gel layer 50 is thus partially restrained by sides 54, assisted by downward force applied by the foot to engage beveled surface 42 with beveled surface 49.

Figure 4:
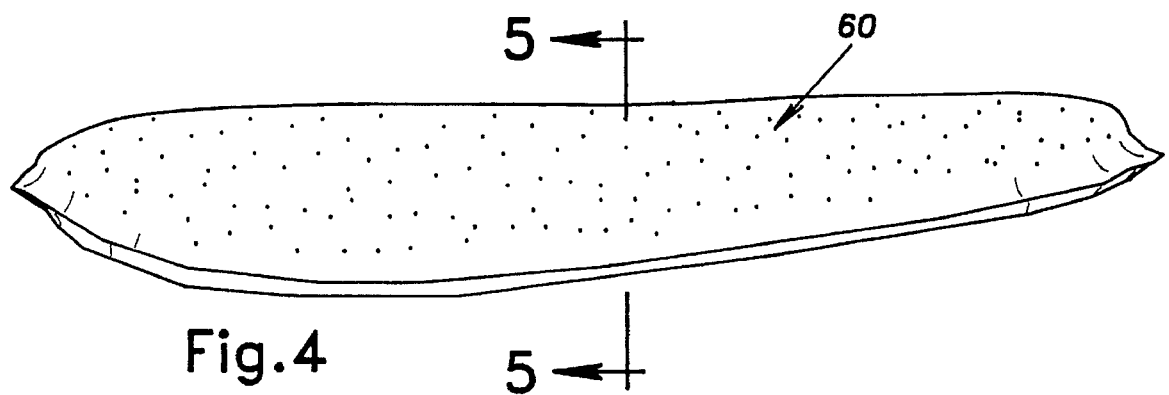
FIG. 4 is a perspective view of a removable insole in accordance with the present invention.
Figure 5:
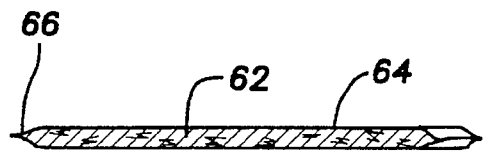
FIG. 5 is a sectional view taken along line 5—5 of FIG. 4.

With reference to FIGS. 4 and 5, there is shown a removable insole 60 which constitutes the member used to produce a custom-fitting footbed. The insole 60 comprises a formable material, specifically a gel material 62, preferably encased in a flexible envelope or pouch 64 preferably heat sealed around the perimeter such as at 66 and preferably airtight to contain fumes, to protect from contamination, and to prevent the possibly sticky gel material from sticking to the person or other objects. The removable insole has the general shape of the underside or bottom of a person's foot or of the interior bottom of a shoe.

The top sole is preferably a light weight sponge or elastomeric foam material, with or without a fabric cover. Alternately, the top sole can be of a similar material to the bottom sole or a light weight fabric. The top sole is flexible and able to conform to the shape of the gel layer. The bottom sole is preferably a blend of SBR and natural rubber, containing normal rubber additives such as Hi-Sil ABS, which acts as an impact modifier, and accelerators for vulcanization. It can be molded in cast aluminum molds at 350° for 4 to 5 minutes using techniques well known in the art. Other polymeric or other materials, including foams such as flexible foams to reduce weight, known in the art may be utilized for the top and bottom soles. These materials and all the non-gel material parts of the footwear should be able to tolerate the microwaving and/or oven heating described hereinafter. The bottom sole is flexible to permit walking.

The envelopes 59 and 64 are preferably made from aromatic polyether polyurethane thermoplastic film available from Deerfield Urethane, Inc., South Deerfield, Mass. Alternatively they can be made from a coextrusion with nylon or polyester on the outside to provide heat resistance and an olefin on the inside to allow the envelope to be heat sealed. Such coextrusions are available from Roll Print Packaging Products, Inc., Addison, Ill. or Custom Co-Ex, Atlanta, Ga. The envelopes 59 and 64 should preferably be able to withstand the heating process described hereinafter and should be non-crinkly, compliant, flexible and able to conform to the shape of the foot or body part as it makes an impression in the gel material. Alternatively, a piece of woven polyester, such as available from DuPont as SANDED COOLMAX, or a piece of leather can be attached to the surface of the envelope 64 that will be next to the foot or body part to provide more absorbency and to make the member or article more comfortable. Preferably, the envelopes are made from two layers (top and bottom) and are heat sealed using an RF sealing machine available from Callanan in Elk Grove, Ill.. This yields a feather edge as shown at 66.

With reference to FIGS. 6 and 7, there is shown a hand grip gel pad or member 70 comprising a flexible envelope 74 containing a body of formable material, specifically gel material 76. The gel pad 70 has end tabs 71 and 72. On the surface of the end tabs are hook and loop fasteners, such as Velcro, for securing the gel pad in frictional engagement around the handle portion 79 of the tennis racket 78. The gel pad can be affixed to the handle portion by other attachment means, such as snaps, adhesive, Velcro, stitching, or insertion into a pre-existing pocket such as a fabric pocket. Alternatively, the gel pad may be permanently integral with the handle portion, in which case the handle portion may screw into the rest of the racket and thus be separable therefrom.

Figure 9:
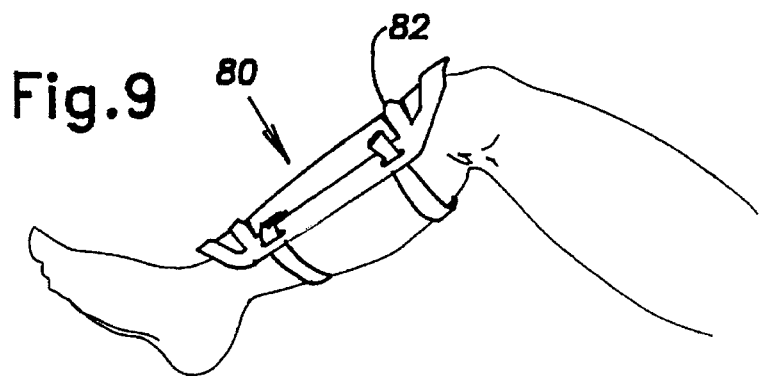
FIG. 9 shows the shin guard of FIG. 8 on the shin of a person.

With reference to FIGS. 8 and 9, there is shown a shin guard 80 comprising a hard plastic outer shell 82, a body pad or gel pad or member 84, and straps 90 having terminal Velcro portions 92. The gel pad comprises a flexible envelope 86 containing gel material 88.

Figure 10:
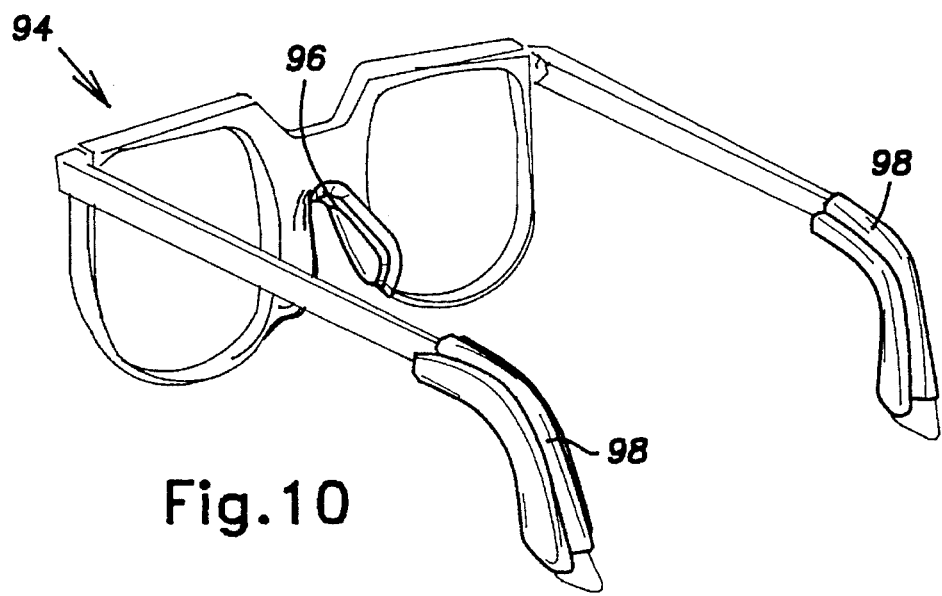
FIG. 10 is a perspective view of a pair of glasses with a nose pad and two ear pads according to the present invention in place.
Figure 11:
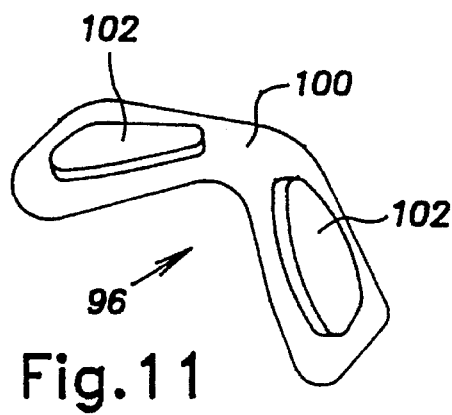
FIGS. 11 and 12 are perspective views of the nose and ear pads, respectively, of FIG. 10.
Figure 12:
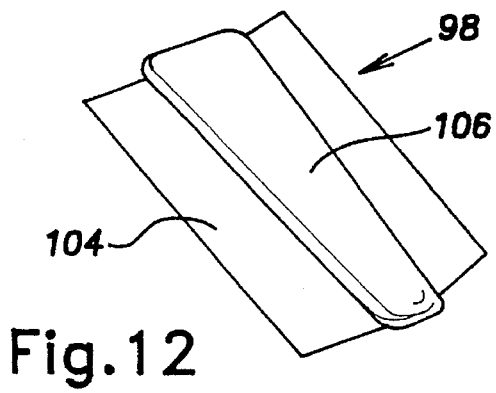

With reference to FIGS. 10, 11 and 12, there is shown a pair of glasses 94 having affixed thereto nose pad 96 and ear pads 98, said nose pad and ear pads being body pads. Nose pad 96 has gel pads 102 on a plastic strip 100 having pressure sensitive adhesive on the back side thereof for attachment to the glasses. Ear pad 98 has a gel pad 106 attached to a plastic strip 104 having pressure sensitive adhesive on the back side thereof for attachment to the glasses.

Figure 13:
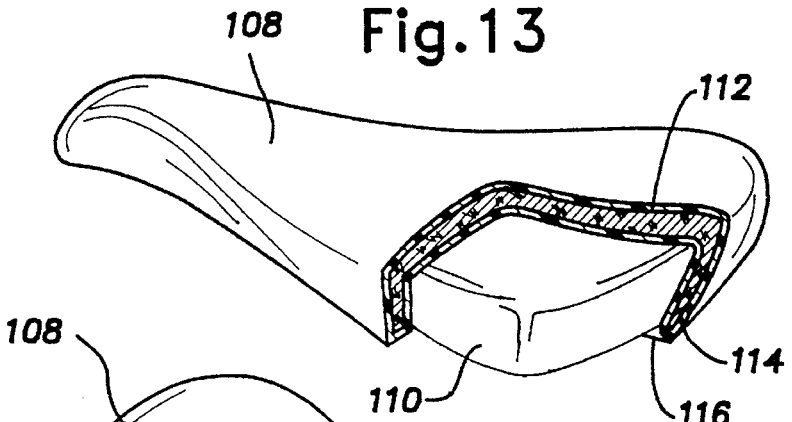
FIG. 13 is a perspective view, with a portion cutaway in cross section, of a bicycle seat pad according to the present invention.
Figure 14:
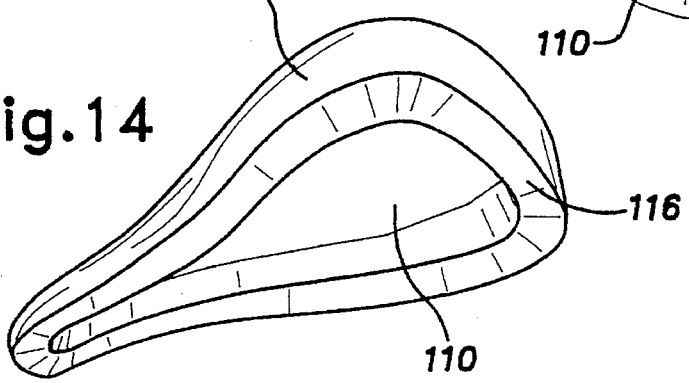
FIG. 14 is a perspective view of the underside of the bicycle seat pad of FIG. 13.

With reference to FIGS. 13 and 14, there is shown a member, specifically a bicycle seat pad 108, mounted on a hard bicycle seat preform 110. The seat pad comprises a flexible envelope 112 containing gel material 114 and has an elastic edge portion 116 for attachment to the preform.

Figure 15:
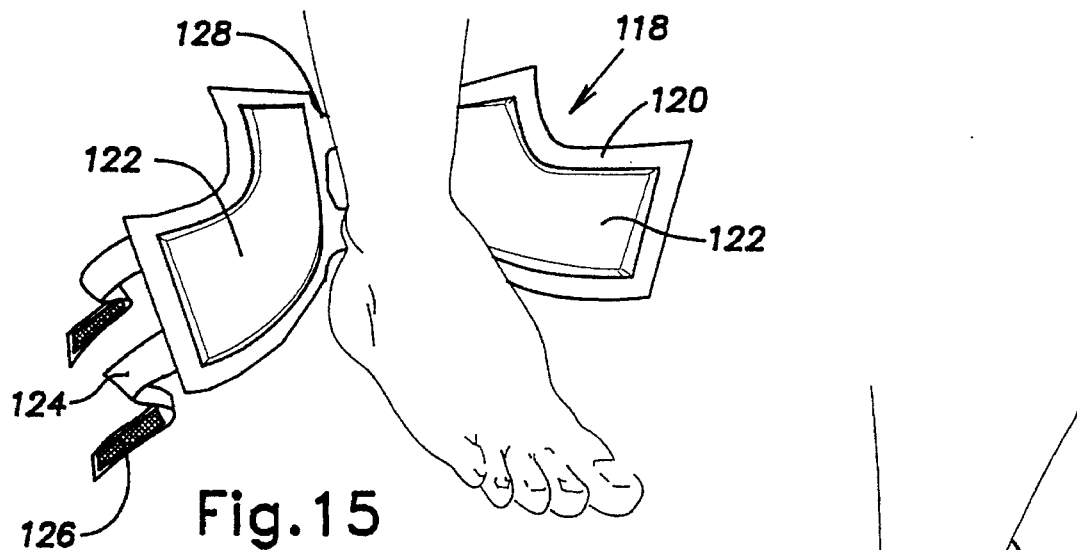
FIG. 15 is a perspective view of an ankle cast about to be positioned on an ankle.
Figure 16:
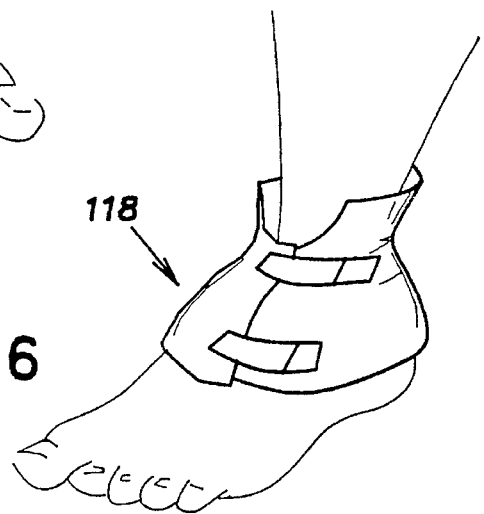
FIG. 16 shows the ankle cast of FIG. 15 in position.

With reference to FIGS. 15 and 16 there is shown an ankle cast 118 comprising gel pads or members 122 affixed permanently or disattachably such as by Velcro to an exterior flexible support material 120 such as plastic or fabric or, alternatively, a rigid plastic or other rigid support material. The two halves of the cast are joined by a hinge portion 128. Extending from the exterior support material are straps 124 terminating in portions having Velcro strips 126. The cast is thus removable. FIG. 16 shows the ankle cast in position on the ankle, secured by the Velcro strips.

Preferred embodiments of the gel material are as follows.

| PREFERRED FORMULATIONS A, B, & C (Parts by Weight) | | | | |
| --- | --- | --- | --- | --- |
| Ingredient | A | B | C | Preferred Range |
| 1. High viscosity uncured silicone rubber | 10.0 | 0 | 0 | ±10% |
| 2. Low viscosity uncured silicone rubber | 56.67 | 66.67 | 66.67 | ±10% |
| 3. Modified EVA powder | 33.33 | 33.33 | 33.33 | ±10% |
| 4. Dioctyl adipate | 5.0 | 15.0 | 15.0 | ±15% |
| 5. Epoxidized soybean oil | 7.0 | 0 | 0 | ±25% |
| 6. Fumed silica | 7.5 | 5.0 | 5.0 | ±10% to −20% |
| 7. Calcium carbonate | 15.0 | 30.0 | 15.0 | ±50% |
| 8. Color pigment | 0.5 | 0.35 | 0 | ±3% |
| 9. Reodorant | 0 | 0.20 | 0.20 | ±50% |
| 10. Peroxide A | 4.6 | 4.0 | 0 | ±15% |
| 11. Peroxide B | 0 | 0 | 10.6 | ±5% |
| 12. Peroxide C | 0 | 0 | 6.0 | ±5% |

The high viscosity uncured silicone rubber used is a high viscosity (10,000 centistokes) vinyl-terminated polydimethyl siloxane available from Dow Chemical as Silicone 4-4758. Silicone 4-4758 contains amorphous silica. The low viscosity uncured silicone rubber used is a low viscosity (1,000 centistokes) vinyl-terminated polydimethyl siloxane available from Dow Chemical as Silicone 4-2901. The modified EVA powder used (Elvaloy 742) is ethylene vinyl acetate modified by the addition of carbonyl groups to make a solid plasticizer. It is available as a fine particle size powder (it has a 30 mesh maximum) from DuPont and acts as a thixotropic agent. It has a molecular weight greater than 250,000, a crystalline melting temperature of 45° C., a glass transition temperature of −32° C., a Shore A durometer hardness of 55, and the powder has a bulk density of 22.4 lb/ft$^3$. It also acts as an extender, reducing the cost. Dioctyl adipate, a monomeric plasticizer which partially solvates and swells the modified EVA powder, is a liquid and is available from C. P. Hall, Stow, Ohio. The epoxidized soybean oil used is a low volatility polymeric liquid plasticizer and stabilizer liquid and is available as Paraplex G-62 from C. P. Hall, Stow, Ohio. Fumed silica acts as a thixotropic agent and is available from Cabot Corp., Cab-O-Sil Div., Tuscola, Ill. as Cab-O-Sil M-5. The calcium carbonate used (325 mesh) acts as a filler and is available from Harwick Chemical as A-1 Whiting. The color pigment used is ultra marine blue sodium aluminum sulfo silicate complex available from Akro Chemical. Other pigments can be used. The reodorant used (Stan Mask 25243) provides a pleasant smell or odor and is available from Harwick Chemical.

The peroxides are crosslinking or setting agents and permanently set the silicone rubber by crosslinking. Peroxide A is Dow Chemical product STI-T, being bis (2,4-dichlorobenzoyl) peroxide, 50% concentration in silicone oil, available oxygen about 2.1%, recommended crosslinking temperature 230°–270° F. It is a diacyl peroxide. Peroxide B is Varox 231 XL, available from Atochem, Buffalo, N.Y., being 1,1-di(t-butylperoxy)3,3,5-trimethylcyclohexane peroxide, 40% concentration on inert filler, 4.23% active oxygen, recommended crosslinking temperature 280°–360° F. It is a peroxyketal. Peroxide.C is Luperco 101 XL, available from Atochem, Buffalo, N.Y., being 2,5-dimethyl-2,5-di(t-butylperoxy) hexane, 45% solid on an inert filler, 4.96% active oxygen, recommended crosslinking temperature 320°–400° F. It is a dialkyl peroxide. Alternatively, Luperco AST from Atochem can be used. It is a diacyl peroxide, 50% paste with silicone oil, 3.3% active oxygen, recommended cure range 200°–280° F. It operates quickly, since it activates at a lower temperature, and can cause some foaming, which is desirable if a more cushiony product is desired. Alternatively, other organic peroxides known in the art can be used, care being taken to select the peroxide to match the uncured silicone rubber and activate within the preselected or desired crosslinking or heating temperature. Peroxides can be selected to achieve a preselected minimum setting temperature. Preferably, there are generally about 4–10 parts by weight of peroxide agents such as above per 66.67 parts silicone rubber. Enough crosslinking agent should be added to reduce the curing or setting time to the preferred setting time of between preferably 3–30 minutes, but without detrimental effect on the composition such as excessive temperature or excessive foaming. Sufficient amounts of the various ingredients should preferably be added so that the final product meets the preferred characteristics described herein. Alternatively, it is believed one may use platinum crosslinking agents known in the art.

Other heat-curable silicone rubbers (including high and low-viscosity) known in the art, principally dimethyl siloxane polymers with reactive groups such as —CH=CH$_2$, —OH, and —OR, can be used, care being taken to match the silicone rubber with the crosslinking agent and achieve the proper viscosity. Vinyl-terminated polydimethyl siloxane is preferred. The discussion of silicone rubbers in *Modern Plastics Encyclopedia* 90, Mid-October 1989, Vol. 66, No. 11 (1989) pp. 155–6 is incorporated herein by reference. Formulation A shows a combination of high and low viscosity silicone rubbers; other combinations can be used. Less preferably, the silicone rubber can be all high viscosity. Room-temperature vulcanizing silicone rubbers, generally silanol-terminated, are not preferred. They can cure by reacting with atmospheric moisture, thus requiring that the envelope be non-airtight.

For the modified EVA powder, it is believed that other EVAs in fine powder form may be substituted, including EVA (preferably 18–30% vinyl acetate), and it is believed that other ethylene copolymers and/or terpolymers or mixtures thereof in fine powder form may also be substituted, including ethylene methyl acrylate, ethylene ethyl acrylate, and ethylene vinyl acetate acid terpolymer such as ELVAX 4310 from DuPont. Preferably the ethylene copolymer or terpolymer or mixture thereof is about 20–35% by weight of the uncured silicone rubber, ethylene copolymer or terpolymer or mixture thereof, and liquid plasticizer present. The addition of the Elvaloy 742 with liquid plasticizer (which swells and partially solvates the Elvaloy) to the gel material results in unexpectedly higher viscosity and makes it unexpectedly more thixotropic, which are advantages. Sufficient fine powder EVA or ethylene copolymer or terpolymer or mixture should be added with sufficient liquid plasticizer to provide an effective or sufficiently high viscosity so that the gel material will preferably not creep at room temperature and will hold and provide an effective impression for the intended purpose without detrimentally affecting the other desired performance characteristics. The phrase ethylene copolymer or terpolymer includes modified EVA and Elvaloy 742.

For the calcium carbonate other fillers can be substituted, including talc, calcined clay, silica, and aluminum and magnesium silicates. Filler, pigment, and reodorant are not believed to be necessary for the composition, but are generally preferred.

For the dioctyl adipate, it is believed that one can substitute higher molecular weight liquid adipates, and dioctyl phthalate and higher molecular weight liquid phthalates, all being liquid solvating plasticizers.

Other additives known in the art can be used or substituted in the above compositions.

Generally, the formulations can be prepared preferably by adding the silicone first, the rest in any order, with the crosslinking agent last. Preferably as little air, water, and water vapor as possible is entrained or mixed in. The percentages of the ingredients may be varied to achieve desired results, preferably within the Preferred Range indicated. The amount of plasticizer can be varied to vary the firmness or softness of the set product. Preferably, the cured or set gel material of the present invention has a tensile strength of at least 100 psi, more preferably at least about 150–175 psi, and elongation at break of at least 200%, more preferably about 300–600%. In many applications, when it has a tensile strength of at least about 100 psi and elongation at break of at least about 200%, it is set to an effective extent. Elongation at break measures the ability of something to stretch and is expressed as percent of the original length measured at the moment of rupture.

When the gel material of the present invention is sufficiently heated, followed by cooling, it sets, that is, what was formable before becomes firm yet resilient. The setting is not due to the evaporation of a solvent, as in U.S. Pat. No. 4,120,064.

With regard to Formulation A, the uncured or unset gel material has a density of approximately 1.02 gm/ml, an average viscosity of about 171,100 poise at about 77° F. at a shear rate sweep of 0.1 to 100 rad/sec, and is believed to have an indefinite shelf-life or at least a very long shelf-life. It does not cure or set at room temperature and has a minimum setting temperature greater than 130° F. There is no significant or visibly discernible volumetric change when it sets. With a peroxide which reacts at a lower temperature, the product may foam a little bit if too much heat is applied too quickly. When Formulation A is set, it is flexible, elastic, and resilient and has a density of approximately 0.99 gm/ml. Preferably, after setting it will have a Shore-A durometer hardness of approximately 25–30 hardness points; preferably it will be softer than solid cork but harder than common foam rubber innerliners and have a density approximately equivalent to that of water. Preferably the unset gel material is pumpable into an envelope and preferably has an average viscosity between about 100,000 and about 220,000 poise, more preferably between about 150,000 and about 190,000 poise, measured at 77° F. and at a shear rate sweep of 0.1 to 100 rad/sec. The viscosity can be adjusted to meet specific viscosity needs in particular applications using methods known in the art.

Other gel material compositions can be used, such as for example a vinyl plastisol such as described in U.S. patent application Ser. No. 08/002,281, the contents of which are incorporated herein by reference. Also, a urethane based gel can be used which utilizes a "single package" (one component) urethane resin with good package stability. The urethane component can be purchased as a nearly completed compound which can be thermally cured via heating in a microwave or conventional convection oven to a Shore-A hardness of 20–80. This urethane component is available from ARNCO, Southgate, Calif. under the brand name Catapol, Product No. SR70. The systems described above, with the fillers and/or thixotropic agents and/or other additives described herein or in U.S. patent application Ser. No. 08/002,281, are setable upon heating. The urethane and silicone gel systems cure or set or vulcanize in a crosslinking reaction and can be referred to as single package crosslinking polymer systems. Silicone gels are preferred in the practice of the present invention since, if the customer heats it too much or the microwave generates an excessively hot hot spot, it simply melts; it does not degrade to or form a gas, such as a possibly harmful gas.

Formulations A, B, and C, uncured, can be referred to as silicone gel. They use plasticizer to solvate and swell a modified EVA resin. They are white in their unpigmented state, relatively difficult to compress, with a consistency and texture approximating cookie dough or Play Dough. They are moldable and accept and maintain or hold impressions. They are sufficiently stiff or viscous so that the person gets a suitable idea of how it will feel after the gel material is set. They exhibit no discernible creep at room temperature (sometimes called cold flow), which is preferable. The set gel is flexible, resilient, and a soft rubber-like material.

The tensile strength and elongation at break of Formulations A, B, and C were measured per ASTM D412 after preselected periods of curing at a preselected temperature in a forced air oven at ambient pressure. Specimens were pressed out at 0.089–0.110 in. thick and cut into strips 0.5 in. wide×4 in. long. Time is in minutes, TS is tensile strength in psi, and Elongation is percent elongation at break. The results are as follows:

TABLE 1

| Formulation | Temperature at 225° F. | | |
|---|---|---|---|
| | Time | TS | Elongation |
| A | 8 | 135 | 580 |
| A | 10 | 145 | 600 |
| A | 15 | 163 | 550 |
| A | 25 | 170 | 570 |

TABLE 1-continued

Temperature at 225° F.

| Formulation | Time | TS | Elongation |
|---|---|---|---|
| A | 30 | 163 | 540 |
| A | 45 | 175 | 560 |
| B | 10 | 88 | 230 |
| B | 15 | 100 | 240 |
| B | 25 | 104 | 220 |
| B | 30 | 85 | 200 |
| B | 45 | 90 | 200 |
| C | 10 | 112 | 165 |
| C | 15 | 110 | 180 |
| C | 25 | 109 | 175 |
| C | 30 | 116 | 150 |
| C | 45 | 96 | 130 |

TABLE 2

Temperature at 250° F.

| Formulation | Time | TS | Elongation |
|---|---|---|---|
| A | 5 | 160 | 390 |
| A | 6 | 178 | 410 |
| A | 10 | 190 | 470 |
| A | 13 | 175 | 480 |
| A | 25 | 170 | 500 |
| B | 10 | 81 | 160 |
| B | 15 | 95 | 200 |
| B | 18 | 100 | 230 |
| B | 23 | 103 | 290 |
| B | 27 | 96 | 280 |
| C | 10 | 98 | 230 |
| C | 15 | 112 | 255 |
| C | 18 | 115 | 250 |
| C | 20 | 118 | 240 |
| C | 25 | 117 | 250 |

TABLE 3

Temperature at 275° F.

| Formulation | Time | TS | Elongation |
|---|---|---|---|
| A | 4 | 93 | 200 |
| A | 5 | 114 | 300 |
| A | 10 | 184 | 500 |
| A | 25 | 210 | 620 |
| B | 10 | 123 | 305 |
| B | 13 | 130 | 310 |
| B | 25 | 116 | 350 |
| C | 8 | 133 | 260 |
| C | 10 | 124 | 225 |
| C | 25 | 124 | 230 |

TABLE 4

Temperature at 300° F.

| Formulation | Time | TS | Elongation |
|---|---|---|---|
| A | 2.5 | 125 | 480 |
| A | 3.0 | 127 | 460 |
| A | 4.0 | 94 | 440 |
| A | 4.5 | 143 | 490 |
| A | 6.0 | 147 | 470 |
| A | 10.0 | 149 | 470 |
| B | 3.0 | 109 | 340 |
| B | 4.0 | 103 | 320 |
| B | 4.5 | 95 | 300 |
| B | 6.0 | 124 | 310 |
| B | 10.0 | 118 | 320 |
| C | 3.0 | 100 | 275 |

TABLE 4-continued

Temperature at 300° F.

| Formulation | Time | TS | Elongation |
|---|---|---|---|
| C | 4.0 | 93 | 260 |
| C | 4.5 | 105 | 265 |
| C | 6.0 | 138 | 240 |
| C | 10.0 | 121 | 250 |

TABLE 5

Temperature at 325° F.

| Formulation | Time | TS | Elongation |
|---|---|---|---|
| A | 2.0 | 94 | 500 |
| A | 2.5 | 157 | 400 |
| A | 3.0 | 188 | 515 |
| A | 3.5 | 185 | 500 |
| A | 4.0 | 180 | 490 |
| A | 6.0 | 179 | 460 |
| A | 10.0 | 173 | 440 |
| B | 3.0 | 95 | 320 |
| B | 3.5 | 86 | 325 |
| B | 4.0 | 98 | 340 |
| B | 6.0 | 115 | 350 |
| B | 10.0 | 119 | 340 |
| C | 3.0 | 77 | 270 |
| C | 3.5 | 73 | 275 |
| C | 4.0 | 75 | 260 |
| C | 6.0 | 132 | 250 |
| C | 10.0 | 128 | 230 |

TABLE 6

Temperature at 350° F.

| Formulation | Time | TS | Elongation |
|---|---|---|---|
| A | 1.5 | 97 | 500 |
| A | 2.0 | 114 | 550 |
| A | 2.5 | 118 | 560 |
| A | 3.0 | 128 | 560 |
| A | 3.5 | 131 | 550 |
| A | 4.0 | 141 | 520 |
| A | 6.0 | 148 | 510 |
| A | 8.0 | 162 | 500 |
| A | 10.0 | 156 | 490 |
| B | 2.5 | 53 | 270 |
| B | 3.0 | 68 | 290 |
| B | 3.5 | 82 | 300 |
| B | 4.0 | 102 | 310 |
| B | 6.0 | 95 | 280 |
| B | 8.0 | 90 | 270 |
| B | 10.0 | 96 | 275 |
| C | 3.0 | 56 | 240 |
| C | 4.0 | 123 | 310 |
| C | 6.0 | 125 | 280 |
| C | 8.0 | 123 | 300 |
| C | 10.0 | 126 | 320 |

In a preferred embodiment, the envelope is heat sealed most of the way around with a protruding tab and injection port at an end or side, such as the heel end of an insole. The gel material is injected into the port. Preferably, the air is forced out by rolling the article or a vacuum is created inside of the envelope to eliminate air. Then the injection port is heat sealed and the protruding tab is cut off. Alternatively, the gel material can be rolled into sheets about ⅛ to ¼ inch thick, die cut, and heat sealed into a flexible envelope.

With regard to FIGS. 1–3, glue is applied around the perimeter between the top and bottom soles to hold the soles together and contain the gel layer therebetween. The gel layer and top sole are thus integral parts of the completed sandal.

A removable insole or other custom-fitting article may be manufactured or provided with temperature sensing and indicating means affixed or attached or joined or thermally coupled thereto for sensing and indicating a temperature of the gel material or of the member during the heating. For example, a temperature indicator strip or thermometer tape may be affixed in contact with the gel material but beneath the flexible envelope 64 and visible therethrough. Such a strip is available from Markal Company, Chicago, Ill. and has a range of temperatures and indicates the highest temperature reached. A preselected preferred heating temperature can be determined through routine procedures. Then, when the person heats the member, they can look at the indicator strip to see if the proper temperature was achieved for curing or setting the gel material. This would, for example, allow the heating to take place at a location, such as the customer's home, where the conditions of the heating process, such as microwaving, are less controlled. For example, there are many different energy levels in home microwaves. This would permit mail order sales of such things as removable insoles, etc. directly to consumers. The strip can also be used at different locations on the member, including on the outer surface of the envelope, such as temperature indicator strip 61 shown in FIG. 4, or on the box within which the member is being heated, for the same purpose. Such a strip could also be used in conjunction with sandals or other footwear, at different locations thereon, for the same purpose, such as by placing or attaching a strip to the top sole. Other temperature sensing and indicating devices or systems known in the art can also be used, such as a "turkey popper" device inserted into the center of the gel (conventional oven only), which would pop out when the gel had been heated sufficiently. A heat sensitive paint or ink or coating that changes color at different temperatures can also be used, "Affixed", as used in the claims, is meant to cover all such modes of attaching, joining, or thermally coupling.

The following examples help to illustrate the present invention.

EXAMPLE 1

A size 10 sandal comparable to that illustrated in FIG. 1 was produced. The bottom sole weighed approximately 180 g and was 11 in. long and about 4¼ in. wide at the toe section and 3¼ in. wide at the heel section. The top sole was comparably sized and weighed approximately 50 g. The bottom sole was a blend of SBR and NR rubber and contained normal vulcanizing, processing and extender additives. The top sole was a lightweight foamed EPDM rubber available from Spenco Corp., Waco, Tex. The envelope for the gel was the polyether polyurethane film described above, available from Deerfield Urethane, Inc. It weighed approx. 10 g without gel and was 10 in. long by 2.5 in. in the heel section and 3.25 in. in the toe section. The top sole was bonded to the bottom sole with a few spots of adhesive around the perimeter with the gel layer therebetween. The uncured gel material, which weighed approximately 70 g and was inside the envelope, was Formulation A described above. The test individual weighed about 225 lbs. The ambient temperature was approximately 70° F.

The person inserted his foot into the sandal and tightened the straps. No mixing of an additive, catalyst, etc., or kneading, was necessary prior to the person making the impression. The person rocked from toe to heel and walked for 1 minute to form the impression and see how the sandal would fit prior to setting. This biased the member against the body part. The sandal was removed and inspected for molding properties. The foot imprint was found to be very good with clear definition of contours.

A Sharp Carousel II, 1.6 cubic feet and 900 watts, microwave oven was used. The magnetron frequency was 2450 and it had a turntable which automatically rotated the item being heated. It had a heating compartment 16¹¹⁄₁₆ inches wide, 16¹¹⁄₁₆ inches deep, and 9¹¹⁄₁₆ inches high. The microwave oven was operated throughout at full power. The sandal was placed onto the turntable and microwaved or heated for 30 seconds followed by a 60 second cool down period. This procedure was repeated three more times. The total elapsed time from the beginning of the first microwaving to the end of the last cool down was approximately 6 minutes. No fumes or objectionable smells were observed throughout the heating procedure. The envelope was not pierced and the gel material was not exposed to the ambient atmosphere during the above procedure. The envelope was allowed to cool until it was easy to handle.

Upon inspection, it was observed that the gel layer retained the original impression of the foot. The gel was found to be totally set. It was flexible, resilient, and had a Shore A hardness of 25 hardness points, tensile strength of 125 psi and elongation at break of 500%. There were no signs of thermal degradation of the gel or the envelope. Other power levels and heating and cooling sequences can be used.

EXAMPLE 2

A removable insole (for a size 9 shoe) as illustrated in FIGS. 4 and 5 was produced. One side of the envelope was 0.010 inches polyether polyurethane described above and the other side was 0.010 inches polyether polyurethane with a nylon fabric (Sanded Coolmax available from Starensier, Newburyport, Mass.) laminated to the outer surface (to be next to the foot). The envelope weighed approximately 10.5 g without gel and was 10.75 in. long×2.5 in. heel×3.5 in. toe. The gel material was the same composition used in Example 1 and weighed approximately 45 g. The total weight of the envelope and gel was approximately 55.5 g. The test individual weighed about 225 lbs. The person loosened the laces and removed his shoe. The gel-filled insole, fabric side up, was inserted into the shoe. The person inserted his foot with sock on, tightened the laces, and walked on the insole for approximately 5 minutes. This biased the member against the body part. The shoe was removed and the insole was removed from the shoe. Inspection of the insole indicated an exact impression of the person's bottom foot surface. There were no deformations of the molded impression due to removing the insole from the shoe.

The insole was placed fabric side facing down in the microwave oven used in Example 1 and microwave heated full power for 30 seconds. The insole was immediately placed into a preheated mechanical convection lab oven, Model OV.500 C-2, available from Blue M, Blue Island, Ill., at 300° F. for 7.5 minutes. The total elapsed time from the beginning of the microwave heating to the end of the oven heating was about 8 minutes. As in Example 1, fumes and smells were not observed as being produced. Also, there was no noticeable change in size and/or shape and/or impression of the insole due to the microwave heating or oven heating.

The air temperature inside the microwave oven was approximately 90°–100° F. when the door was opened at the end of the microwaving cycle. At the end of the lab oven cycle, the temperature of the surface of the insole was 300° F. The insole was air cooled for about 10 minutes, which would have permitted the insole to be comfortably worn by a purchaser. The insole could also be cooled by putting it in a plastic bag and submerging in cold water for 2–5 minutes. Upon inspection, it was observed that the gel layer retained the original molded impression of the foot and the gel material was found to be totally set, flexible, and resilient with no signs of the thermal degradation. The gel material had a Shore A hardness of 27 hardness points, tensile strength of 140 psi, and elongation at break of 500%.

EXAMPLE 3

Example 2 was repeated with certain changes. Unless indicated, the materials, conditions, procedures, and results were the same. The gel material used was the same gel material as used in Example 2. The removable insole envelope (a men's size 9) weighed about 10 g and contained about 45 g of gel material, the gel-filled insole thus weighing about 55 g. The test individual weighed about 195 lbs.

The insole was placed with the fabric side down in a bleached sulfate cardboard box 12.5 in. long, 4.25 in. wide and 0.5 in. high. The box and insole were placed in a microwave oven (GE Model #1435, 1.2 cf, 800 watts) and heated at full power for 30 seconds and then they were immediately put into a preheated gravity convection conventional gas oven (Kenmore #9117258411) set at 275° F. for 7.5 minutes. When the insole was removed from the oven, its internal temperature was measured at 300° F. The insole was air cooled for 5 minutes. The gel layer retained the original impression and the gel material was found to be totally set, flexible, and resilient with no signs of thermal degradation. The gel material had a Shore A hardness of 26 hardness points, tensile strength of 132 psi, and elongation at break of 510%.

EXAMPLE 4

Example 3 was repeated with certain changes. Unless indicated, the materials, conditions, procedures, and results were the same. Microwaving was not used. A gel-filled envelope insole weighing about 55 g was placed into a cardboard box as used in Example 3 after forming the impression. The box and insole fabric side down were placed in a preheated gravity convection conventional electric oven (Electric Amana Model #ARC-100, 30 in. wide) set at 275° F. for 10 minutes. The insole internal temperature after the baking cycle was 312° F. (This indicates that conventional ovens may heat 25°–40° F. higher than the dial is set at.) The insole was allowed to air cool for 10 minutes. The gel layer retained the original impression and the gel material was found to be totally set, flexible, and resilient with no signs of thermal degradation. The gel material had a Shore A hardness of 27 hardness points, tensile strength of 130 psi, and elongation at break of 490%.

In the practice of the present invention, the heating or application of thermal energy may be done all in a microwave oven (preferably 900 watts or less), all in a convection oven, or in a combination of the two (preferably one as quickly as possible after the other), or in other types of heating devices, the variety of options being an advantage. Conventional convection ovens includes gas or electric ovens. In one preferred embodiment, the gel pad or member or article is heated initially in the microwave for a short period such as 30 seconds or 5–10% of the total heating time, to start the cure quickly and get sharp definition yet avoid possible hot spots, followed immediately by the remaining heating in a convection oven. Many home microwave ovens vary widely in power and temperature and may generate hot spots, thus in another preferred embodiment all or most of the heating is done in a convection oven, where temperature may be more closely controlled and hot spots are not present. Many microwaves may generate hot spots in the item being heated, where microwave energy is concentrated. Thus in many cases it is preferable to place the gel pad or member or article being microwaved inside a cardboard or other type of paperboard box, which moderates and evens out the hot spots and helps distribute the microwave energy. Preferably, such a cardboard box also serves as the packaging for the gel pad or member or article when purchased or received by the customer.

Preferably the member or gel pad is heated at a temperature less than 450° F., more preferably less than 400° F. since a more moderate temperature is less stressful to the gel pad or, if the gel pad is attached to an article such as a bicycle seat or plastic shin guard and the gel pad is being heated and cured while attached to the article, to the article, and also easier for the customer, and if the gel pad or member or article is in a cardboard box, the box is less likely to degrade. The gel material composition of the present invention has a minimum setting temperature greater than 130° F., preferably greater than 175° F., more preferably greater than 200° F., so that it will not set at typical room or storage temperature, even if it is exposed to ambient atmosphere. As used in the specification and claims, a minimum setting temperature greater than 130° F. means that the gel material will not set to an effective extent at a temperature of 130° F. or lower. Preferably the gel material is heated at a temperature of 200°–450° F., more preferably 225°–400° F., more preferably 250°– 375° F., more preferably 275°–350° F., more preferably 300°–350° F., the crosslinking agent being selected to operate within the preselected temperature range. Preferably the gel material will set to an effective extent with 30 minutes, preferably 20 minutes, more preferably 10 minutes, more preferably 5 minutes, even more preferably 3 minutes, or less, of heating, followed by cooling, since the quicker the setting, the faster and more convenient for the customer and the less the energy cost. Speed is of critical importance to the customer; the customer does not want to wait two to three hours. Set to an effective extent means that the gel material is set to an extent that it will operate effectively for the purpose intended. The test results show that a preferred embodiment of the gel formulation can be set in a preheated oven in 2.5 minutes.

The gel material and envelope and method of the present invention can be used to produce a custom-fitting footbed, and also a custom-fitting hand grip for such things as bicycles, sports rackets (including golf clubs and tennis, squash, and racquetball rackets), ski poles, and a water ski tow handle; a custom-fitting body pad, such as a knee pad, shoulder pad, elbow pad, pad inside a helmet, pad inside a chin strap, pad inside a shin guard, pad inside the toe portion of a ballet slipper, pad on a bicycle seat or other types of seats or saddles, nose pads and ear pads for glasses, and a hip pad for a backpack hip belt (the hip pad being attached via Velcro or held inside a pocket such as a fabric pocket); and a custom-fitting orthopedic cast which, as used herein and in the claims, includes braces. The custom-fitting article is adapted to closely conform to the shape of a part of a human or mammal body. Orthotics, such as for the foot, and pads for a portion of the foot, such as a heel cup or toe pad or pad for the ball of the foot, can be made using the disclosed invention using the techniques described with respect to the removable insole. In some cases such an orthotic may be for less than the full length of the underside of the person's foot, such as an arch support. Many orthotics for the foot are removable insoles.

With regard to a custom-fitting hand grip, such as in FIGS. 6–7, the gel pad or member is put into position, such as around the tennis racket handle, and an impression is made at ambient temperature by gripping with the hand. Less preferably, the gel may be unencased in an envelope. After impression, the body part is removed from the gel pad and the gel pad, either by itself or attached to the handle, is put into the microwave and/or convection oven and heated to set the gel material. Once set, the gel pad 70 becomes the hand grip. The gel pad preferably has no metal so it is microwavable. If the gel pad is attached to an article and the article has metal, it may not be microwavable and may have to be heated in a convection oven. Many large articles such as bicycles, tennis rackets, etc. may not fit into an oven or be heatable, thus the gel pad is preferably disattachable, or a portion of the article which can fit into an oven, such as the tennis racket handle, is disattachable such as by being screwed into the rest of the racket or article. The invention is particularly useful for hand grips since the gel pad is conformable with the typical or normal pressure applied by a gripping hand during the activity in question, such as gripping a tennis racket or a bicycle handle. The invention is particularly useful for footbeds because the gel is or can be made sufficiently viscous to be properly conformable during the heavy loadings and shear forces applied when a person walks around on an uncured footbed, yet the person can accurately visualize, while walking on an uncured footbed, what the cured or set product will feel like; also, the footbed is conformable under normal body weight. The invention is particularly useful for a bicycle seat pad (see FIGS. 13–14) because the act of sitting on the bicycle seat for the proper amount of time with normal body loading applies the appropriate amount of pressure to properly conform the seat pad and the cured pad will more evenly distribute the weight of the rider.

With regard to a custom-fitting body pad, such as in FIGS. 8–14, the gel pad or member is put into position on an article, such as into a knee pocket on a football uniform, attached to football shoulder pads, put inside a chin strap, attached inside a football helmet, attached inside a shin guard, placed in the toe portion of a ballet slipper, attached to a bicycle seat, attached as a nose pad or ear pad to glasses, etc. The pad is then brought into position with the corresponding part of the body and the pad is biased or pressed against the body part with sufficient or effective pressure to conform the pad to the shape of the body part and to form an effective impression and more evenly distribute the weight or area concerned. The gel pad or article is then heated and cured as previously described. Preferably the gel pad is disattachable so the rest of the article does not have to be heated. The invention is particularly useful for body pads because the impression can be formed while applying a controlled amount of pressure with the gel pad or article at a preselected orientation to the body part to provide a body pad having an impression tailored to the particular desire or need of the individual.

With regard to a custom-fitting orthopedic cast, such as illustrated in FIGS. 15–16, the cast, with gel pad or member in position, is brought into position with the corresponding body part, such as ankle, foot, lower leg, knee, thigh, hand, finger, wrist, forearm, elbow, arm, etc. The cast is then preferably secured with the approximate amount of pressure desired when the cast will ultimately be worn, biasing the gel pad against the body part with sufficient pressure to conform the pad to the shape of the body part. The gel pad or cast is then heated and cured as previously described. The invention is particularly useful for orthopedic casts since there is little if any volumetric change during the curing process. Thus the impression can be made with the cast in its permanent secured orientation and with the approximate amount of pressure desired when the cast will ultimately be worn. Typically, the impression will automatically be made when the cast is secured.

The invention is applicable to other mammals besides humans, such as orthopedic casts for horses, dogs, and cats, body pads for horse and dog collars and saddles and other articles worn by horses and/or dogs or other mammals.

Although the preferred embodiments of this invention have been shown and described, it is understood that various modifications, replacements, and rearrangements of the components and methods may be resorted to without departing from the scope of the invention as disclosed and claimed herein.

What is claimed is:

1. A method of producing a custom-fitting article which conforms to the shape of a body part of a mammal, the method comprising the steps of:

providing a member comprised of a body of formable material sealed inside a flexible container, the formable material being a silicone gel comprising uncured silicone rubber, an effective amount of crosslinking agent, and effective amounts of a) fine powder (30 mesh maximum) ethylene copolymer or terpolymer or a mixture thereof and b) liquid plasticizer to form a gel effective to receive and retain an impression, said formable material being capable of remaining at room temperature without curing, the body of formable material having a minimum setting temperature greater than 130° F. and being setable by heating for a period not exceeding thirty minutes and subsequent cooling, conforming the member by biasing the member against the body part with sufficient pressure to conform the member to the shape of the body part, and thereafter heating the member for a period not exceeding thirty minutes and thereafter cooling the member so that the formable material is set and the member remains flexible while resiliently retaining an impression of the body part and is utilizable by the mammal as part or all of the custom-fitting article.

2. A method according to claim 1, wherein the custom-fitting article is selected from the group consisting of a custom-fitting footbed which conforms to the shape of the underside of a foot of a person, a custom-fitting hand grip, a custom-fitting body pad, and a custom-fitting orthopedic cast.

3. A method according to claim 1, wherein the member is a removable insole.

4. A method according to claim 1, wherein the member is an integral part of footwear.

5. A method according to claim 1, wherein said heating of the member occurs partially in a microwave oven and partially in a convection oven.

6. A method according to claim 1, wherein said heating of the member occurs exclusively in a convection oven.

7. A method according to claim 6, said heating occurring between 200° and 450° F. for a period not exceeding 20 minutes.

8. A method according to claim 1, wherein the formable material has an average viscosity between about 100,000 and about 220,000 poise at 77° F. at a shear rate sweep of 0.1 to 100 rad/sec.

9. A method according to claim 1, further comprising the step of utilizing temperature sensing and indicating means for sensing and indicating a temperature of the body of formable material or of the member during said heating step.

10. A method according to claim 1, wherein said fine powder ethylene copolymer or terpolymer or a mixture thereof is ethylene vinyl acetate modified by the addition of carbonyl groups.

11. A method according to claim 1, the formable material having an average viscosity between about 100,000 and about 20,000 poise at 77° F. at a shear rate sweep of 0.1 to 100 rad/sec, the formable material having a minimum setting temperature greater than 200° F. and being setable by heating for a period not exceeding ten minutes and subsequent cooling, the member being a removable insole, said formable material consisting essentially of said uncured silicone rubber, said crosslinking agent, said fine powder ethylene copolymer or terpolymer or a mixture thereof, said liquid plasticizer, and fumed silica.

12. A method according to claim 1, said effective amounts of fine powder ethylene copolymer or terpolymer or a mixture thereof and liquid plasticizer being effective to increase the viscosity so the formable material will not creep at room temperature.

13. A member for producing a custom-fitting article which conforms to the shape of a body part of a mammal comprising a body of formable material sealed inside a flexible container the formable material being a silicone gel comprising uncured silicone rubber, an effective amount of crosslinking agent, and effective amounts of a) fine powder (30 mesh maximum) ethylene copolymer or terpolymer or a mixture thereof and b) liquid plasticizer to form a gel effective to receive and retain an impression, said formable material being capable of remaining at room temperature without curing, said body of formable material having a minimum setting temperature greater than 130° F. and being setable by heating for a period not exceeding thirty minutes and subsequent cooling, the member being adapted such that when the member is biased against the body part of the mammal with sufficient pressure, the member will conform to the shape of the body part and the body of formable material is capable of thereafter being set by heating for a period not exceeding thirty minutes followed by cooling so that the member remains flexible while resiliently retaining an impression of the body part and is capable of being utilized by the mammal as part or all of the custom-fitting article.

14. A member according to claim 13, wherein the custom-fitting article is selected from the group consisting of a custom-fitting footbed which conforms to the shape of the underside of a foot of a person, a custom-fitting hand grip, a custom-fitting body pad, and a custom-fitting orthopedic cast.

15. A member according to claim 13, wherein said flexible container is a flexible envelope and the member is a removable insole.

16. A member according to claim 13, wherein the member is an integral part of footwear.

17. A member according to claim 13, wherein the formable material has an average viscosity between about 100,000 and about 220,000 poise at 77° F. at a shear rate sweep of 0.1 to 100 rad/sec.

18. A member according to claim 13, the member having affixed thereto temperature sensing and indicating means.

19. A member according to claim 13, wherein the ethylene copolymer and terpolymer are selected from the group consisting of ethylene vinyl acetate, modified ethylene vinyl acetate, ethylene methyl acrylate, ethylene ethyl acrylate, and ethylene vinyl acetate acid terpolymer.

20. A member according to claim 19, wherein the ethylene copolymer or terpolymer or mixture thereof is about 20 to 35 percent by weight of the uncured silicone rubber, ethylene copolymer or terpolymer or mixture thereof, and liquid plasticizer present.

21. A member according to claim 13, said effective amount of crosslinking agent being effective to achieve effective setting of the silicone gel within twenty minutes at a temperature between 225° and 400° F.

22. A member according to claim 13, wherein said fine powder ethylene copolymer or terpolymer or a mixture thereof is ethylene vinyl acetate modified by the addition of carbonyl groups.

23. A member according to claim 13, said silicone gel further comprising an effective amount of fumed silica.

24. A member according to claim 23, said silicone gel consisting essentially of said uncured silicone rubber, said crosslinking agent, said fine powder ethylene copolymer or terpolymer or a mixture thereof, said liquid plasticizer, and said fumed silica.

25. A member according to claim 23, wherein said fine powder ethylene copolymer or terpolymer or a mixture thereof is ethylene vinyl acetate modified by the addition of carbonyl groups.

26. A member according to claim 25, said silicone gel being capable of setting such that after such setting said gel has a Shore-A durometer hardness of 25–30 hardness points, a tensile strength of at least 100 psi, and elongation at break of between 200% and 600%.

27. A member according to claim 13, said effective amounts of fine powder ethylene copolymer or terpolymer or a mixture thereof and liquid plasticizer being effective to increase the viscosity so the formable material will not creep at room temperature.

* * * * *

UNITED STATES PATENT AND TRADEMARK OFFICE
CERTIFICATE OF CORRECTION

PATENT NO. : 5,555,584
DATED : Sept. 17, 1996
INVENTOR(S) : Dan T. Moore, III, et al.

It is certified that error appears in the above-identified patent and that said Letters Patent is hereby corrected as shown below:

Col. 4, line 54, "Ill.." should be --Ill.--.

Col. 5, line 46, "+10%" should be --+10%--.

Col. 6, line 26, "Peroxide.C" should be --Peroxide C--.

Col. 10, line 51, Table 6, after the line which reads "C  3.0  56  240" insert a line which reads --C  3.5  105  300--.

Col. 11, line 37, "used, "Affixed"" should be --used. "Affixed"--.

Col. 14, line 17, "400°F." should be --400°F.,--.

Col. 17, line 13, "20,000" should be --220,000--.

Col. 17, line 30, "container" should be --container,--.

Signed and Sealed this

Seventeenth Day of December, 1996

Attest:

BRUCE LEHMAN

Attesting Officer

Commissioner of Patents and Trademarks